Patented June 23, 1931

1,811,040

UNITED STATES PATENT OFFICE

CLARENCE H. COX, OF MASSILLON, OHIO

STEEL PRESERVATIVE PAINT

No Drawing.   Application filed August 31, 1929.   Serial No. 389,863.

This invention relates to paints or preservative compositions, particularly adapted to be applied to the surfaces of iron and steel structures and the like for the purpose of preventing oxidation or rusting thereof.

The primary object of the invention is to provide a paint or preservative composition for the surfaces of iron and steel structures and the like, which shall be highly efficacious for the purpose stated as well as economical in cost.

With the above and other objects in view, which will be more readily apparent as the nature of the invention is better understood, the same consists in the novel ingredients and proportions thereof, hereinafter more fully described and claimed.

The paint consists essentially of two parts, designated hereinafter as part A and part B.

Part A contains a number of pigments, such as zinc chromate, basic lead chromate and sublimed blue lead, and a filler, such as magnesium silicate. These ingredients are preferably combined in the following proportions:

|   | Per cent |
|---|---|
| Zinc chromate | 12.5 |
| Basic lead chromate | 12.5 |
| Sublimed blue lead | 25.0 |
| Magnesium silicate | 50.0 |

Part B contains a number of oils, such as linseed and China wood or tung oils, turpentine; an oil drier, and a mineral thinner, such as varnolene, gasoline, benzine, naptha, etc. These ingredients are preferably combined in the following proportions:

|   | Per cent |
|---|---|
| Linseed oil | 60 |
| China wood oil | 20 |
| Turpentine | 10 |
| Oil drier | 5 |
| Mineral thinner | 5 |

In preparing the paint, parts A and B may be combined in the following proportions:

| Part A | 40%–60% |
|---|---|
| Part B | 60%–40% |

My preferred composition contains about 47% of part A and about 53% of part B.

In mixing the various ingredients, the desired proportion of part A is mixed with a small quantity of the linseed or China wood oil, and this mixture is then ground or finely comminuted in a pebble, stone or roller mill. The balance of the desired proportion of part B is then added to this finely ground mixture.

The chromates and sublimed blue lead are employed for their well-known rust-inhibitive properties. Sublimed blue lead is a basic sulphate of lead which has the following approximate analysis:

| Lead sulphate ($PbSO_4$) | 45%–55% |
|---|---|
| Lead oxide (PbO) | 30%–40% |
| Lead sulphide (PbS) | Not over 12% |
| Lead sulphite ($PbSO_3$) | Not over 5% |
| Zinc oxide (ZnO) | Not over 5% |
| Carbon and undetermined | Not over 5% |

Magnesium silicate serves to maintain the pigments in suspension, and is fire-resistant, as well as resistant to the action of acids and alkalis.

The linseed oil may be raw or boiled, and the China wood or tung oil is of the well-processed variety. The oils assist in the formation of a film with the pigments when applied to the surfaces of metallic structures. China wood oil does not form a soap solution in the presence of alkalis, and its presence to the extent indicated, is therefore desirable.

The oil drier serves to oxidize the linseed and China wood oils and thereby insures quick drying of the paint when applied. The turpentine and mineral thinner increase the spreading properties of the paint and also aid to some extent in the drying thereof.

If desired, the zinc chromate may be omitted from part A, in which case the proportion of basic lead chromate in part A will be increased to 25%.

The turpentine, mineral thinner and oil drier may, if desired, be omitted from part B and the proportions of linseed and China wood oils increased in amounts sufficient to bring their combined total up to 100%.

The paint may be applied to the surfaces of the metallic structures by means of a brush or by spraying it thereon with an air gun. It dries in air in eight to twelve hours. The coating is of an elastic nature and is rust-inhibitive and weather-resisting to a very high degree. It does not react chemically with the iron or steel base.

The paint is particularly adapted to be used for painting railroad cars and equipment, automotive equipment, bridges, structural steel, oil tanks, underground pipe, metal signs, pickling rooms, salt works, blast furnaces, coke plants, gas holders, ship building and rubber plants.

Claims:

1. An iron preservative composition consisting of from about 40% to about 60% of a mixture of zinc chromate 12.5%, basic lead chromate 12.5%, sublimed blue lead 25% and magnesium silicate 50%, and from about 60% to about 40% of a mixture of linseed oil 60%, China wood oil 20%, turpentine 10%, and oil drier 5% and a mineral thinner 5%.

2. An iron preservative composition consisting of from about 40% to about 60% of a mixture of basic lead chromate 25%, sublimed blue lead 25%, and magnesium silicate 50%, and from about 60% to about 40% of a mixture of linseed and China wood oils.

3. An iron preservative composition consisting of about 47% of a mixture of zinc chromate 12.5%, basic lead chromate 12.5%, sublimed blue lead 25% and magnesium silicate 50%, and about 53% of a mixture of linseed oil 60%, China wood oil 20%, turpentine 10% and oil drier 5% and a mineral thinner 5%.

4. An iron preservative composition consisting of about 47% of a mixture of basic lead chromate 25%, sublimed blue lead 25% and magnesium silicate 50%, and about 53% of a mixture of linseed and China wood oils.

In testimony whereof I affix my signature.

CLARENCE H. COX.